United States Patent [19]

Cayol et al.

[11] Patent Number: 5,301,632
[45] Date of Patent: Apr. 12, 1994

[54] CONTROL SAMPLE OF A DEEP-FROZEN PRODUCT OR A PRODUCT, WHOSE KEEPING TEMPERATURE MUST BE CHECKED

[75] Inventors: André Cayol, Thourotte; Jean-Pierre Pain, Le Meux; Jean-Luc Berry, 7, Chemin des Vignes, 27650 Le Mesnil-sur-L'Estree, all of France

[73] Assignees: Jean-Luc Berry, Le Mesnil-sur L'Estree; Gradient, Compiegne Cedex, both of France

[21] Appl. No.: 3,677

[22] Filed: Jan. 13, 1993

Related U.S. Application Data

[63] Continuation of Ser. No. 720,476, Jul. 9, 1991, abandoned.

[30] Foreign Application Priority Data

Jan. 9, 1989 [FR] France ................ 89 00160

[51] Int. Cl.$^5$ ..................... G01K 1/02; G01K 11/06
[52] U.S. Cl. ................................ 116/217; 374/160; 374/106
[58] Field of Search ............... 116/216, 217; 374/160, 374/106

[56] References Cited

U.S. PATENT DOCUMENTS

| Re. 25,499 | 12/1963 | Fenity et al. | 116/217 X |
|---|---|---|---|
| 2,460,215 | 1/1949 | Chase | 116/216 X |
| 3,220,259 | 11/1965 | Beyer | 116/217 |
| 3,695,903 | 10/1972 | Telkes et al. | 116/216 X |
| 3,696,679 | 10/1972 | Peterson et al. | 116/217 X |
| 3,701,282 | 10/1972 | Peterson . | |
| 4,941,425 | 7/1990 | Holzer | 116/217 |
| 4,947,786 | 8/1990 | Maynard et al. | 116/217 X |
| 4,998,827 | 3/1991 | Holzer | 116/217 X |

FOREIGN PATENT DOCUMENTS

| 3712201 | 9/1988 | Fed. Rep. of Germany | 116/217 |
|---|---|---|---|
| 3731268 | 4/1989 | Fed. Rep. of Germany | 116/217 |
| 3838661 | 6/1989 | Fed. Rep. of Germany | 116/217 |
| 2239677 | 4/1975 | France | 116/217 |
| 2558346 | 7/1985 | France . | |
| 416148 | 1/1967 | Switzerland . | |
| 0625618 | 9/1981 | Switzerland | 374/160 |
| 2215460 | 9/1989 | United Kingdom | 116/217 |

Primary Examiner—William A. Cuchlinski, Jr.
Assistant Examiner—John L. Beres
Attorney, Agent, or Firm—Oblon, Spivak, McClelland, Maier & Neustadt

[57] ABSTRACT

A check sample of a deep-frozen product or a product is provided, whose keeping, conserving or preserving temperature, which is below ambient temperature, must be controlled or checked. The sample includes a case or envelope, which is sealed in an inviolable manner and, in the case or envelope, a meltable object having a predetermined shape different from the internal shape of the case. This object has a melting point below or equal to the thawing or keeping temperature of the product and the initial shape of the object is impossible to reconstitute following thawing or reheating, even of a partial nature, of the product. According to the invention, the case comprises a first part made invisible and integral with the product or a pack containing the latter by insertion into the pack or the case a second part, which is visible and integral with the first part. The object has a first portion at least partly filling the first invisible part of the case and a second portion having a shape which is at least partly different from the internal shape of the second visible part of the case. This second portion of the object has at least one transparent window for rendering the object visible.

6 Claims, 2 Drawing Sheets

CONTROL SAMPLE OF A DEEP-FROZEN PRODUCT OR A PRODUCT, WHOSE KEEPING TEMPERATURE MUST BE CHECKED

This application is a continuation of application Ser. No. 07/720,476, filed on Jul. 9, 1991, now abandoned.

BACKGROUND OF THE INVENTION

1. Field of the Invention

The present invention relates to a check sample of a deep-frozen product or a product whose keeping temperature or point, which is below ambient temperature, has to be checked.

It is used for checking the maintaining of the deep-frozen state of deep-frozen or frozen products, more particularly intended for human consumption and which must only be defrozen or thawed at the time of their consumption. It can also apply to the checking of the maintaining of the temperature of an unfrozen product, but whose keeping temperature, which is below ambient temperature, has to be carefully respected (e.g. medicaments, photographic films, etc.).

2. Discussion of the Background

It is known that it is dangerous to consume products which, when they have been partly or completely thawed, have undergone refreezing, no matter under what conditions this was carried out.

It is generally the manufacturer of deep-frozen products who packs them and who has the main responsibility with respect to the consumer. However, the forwarding agent or retailer are also responsible for maintaining the deep-frozen state of the products.

It is absolutely indispensable to check maintaining of the deep-frozen state of products supplied by a manufacturer or retailer form the time of their manufacture or packing up to the delivery to a purchaser. Each product generally undergoes, from its manufacture and up to its consumption, a number of different handling, storage and manipulation operations. All these stages are generally referred to as the "cold chain". This expression means that when one of the meshes of this chain is defective, the product must be looked upon as damaged and consequently unsuitable for consumption.

As the manufacturer is mainly responsible for respecting the integrity of the "cold chain", not only when the product has left the place of manufacture, but even when it is stored by the retailer, it is necessary for the said manufacturer to ensure that in no case, even outside his direct supervision, the temperature of the deep-frozen product, no matter whether or not it is in a pack, never exceeds a critical temperature threshold generally corresponding to the thawing temperature until it is received by the consumer. This temperature can vary as a function of the nature of the product. It is generally well below 0° C. and is not necessarily constant.

The checking function exercised by the manufacturer can also be exercised by the retailer, but also and more particularly by the consumer, who must thus be able to refuse any product unsuitable for consumption.

During the manufacture of the frozen product and during the first stages of its distribution, e.g. in cold stores, the means for checking and maintaining the ambient temperature provide adequate guarantees for its being maintained in the deep-frozen state. However, during the final distribution stages, which will bring the product to the consumer, the diversity of the handling operations, the quantity of deep-frozen products, which may or may not be conditioned, can lead to thawing risks, although they may be only of a very short duration.

The putting into place of an effective infrastructure in distribution circuits makes it possible to check the temperature of the products therein. However, this infrastructure is not sufficient and it can advantageously be completed by check samples of the deep-frozen products located in the immediate vicinity of the latter or within a pack or packing surrounding the same. A check sample of this type is e.g. described in Swiss patent 416 148. This check sample comprises a case or envelope sealed in an inviolable manner and having a predetermined internal shape and within the said case a meltable object having a predetermined shape, which is at least partly different form the internal shape of the case and having a volume smaller than the internal volume of the latter. This object has a melting point equal to or slightly below the thawing temperature of the product. It is not possible to reconstitute the initial shape of the object following an even partial thawing of the product, which has led to an even partial melting of said object in the case and no matter what the subsequent refreezing conditions are for the product.

The major disadvantage of such a check sample is that it cannot provide information as to the extent of the possible thawing of the product and in particular the depth to which said product has been partly or completely thawed below the surface thereof. However, such information is particularly useful, because it may make it possible to establish the causes of the thawing and the duration thereof, as well as the thermal energy received by the product during thawing.

Thus, the thawing depth makes it possible to calculate the unfrozen product volume and therefore deduce therefrom the thawing period and the thermal energy received.

The thawing threshold temperatures are subject to risks which are not solely dependent on said temperature, but more specifically on said temperature and the time during which the said thawing threshold has been exceeded, or the said temperature and the thermal energy stored above the threshold temperature. It is not possible to determine these pairs of values with the known check sample.

The object of the invention is to obviate these disadvantages and in particular to provide a check sample of a deep-frozen product making it possible to indicate, not only the surface thawed state thereof, but also the depth therein to which the thawing has taken place, while providing much more precise information as to the time during which the thawed state temperature has been exceeded and as to the thermal energy stored by the product during said thawing. The check sample according to the invention also makes it possible to obtain much more precise information on the thawing, as a result of a better thermal conductivity between the product to be checked and the check sample. The invention also makes it possible to check that a keeping limit temperature has not been exceeded, even when it e.g. exceeds zero.

The invention relates to a check sample for a deep-frozen product comprising a case sealed in an inviolable manner, which is at least partly transparent, which has a predetermined internal shape and, within the said case, a meltable object having a predetermined shape, which is at least partly different from the internal shape of the case and having a volume smaller than the internal volume of the case, said object having a melting point equal to or below the thawing temperature or the temperature at which product is maintained, the initial shape of said object being impossible to reconstitute following an thawing state or even partial reheating of the product having led to an even partial melting of the object in the case, no matter what the subsequent product refreezing or cooling conditions, characterized in that said case comprises a first part made invisible and integral with the product or a pack containing the said product by packaging therein, a second visible part, which is integral with the first part, the object comprising a first portion at least partly filling the first invisible part of the case and a second portion having a shape which is at least partly different from the internal shape of the second visible part of the case, said second portion of the object having at least one transparent window for rendering visible the said object.

According to a first embodiment of the invention, the surface of the second part of the case projects beyond said pack or product.

According to a second embodiment of the invention, the second part of the case is at least partly contained in a recess belonging to the pack or product, extending towards the interior of said pack or product, said transparent window being visible from the outside of said pack or product.

According to a variant of each embodiment of the invention, the first and second portion of the object are separate and made from the same meltable material.

According to another variant of the embodiments of the invention, the first and second portions of the object are integral and made from the same meltable material.

BRIEF DESCRIPTION OF THE DRAWINGS

The features and advantages of the invention can be gathered from the following description relative to the attached drawings, wherein show.

DESCRIPTION OF THE PREFERRED EMBODIMENTS

In the figures same elements are designated by the same reference numbers.

Figure 1:
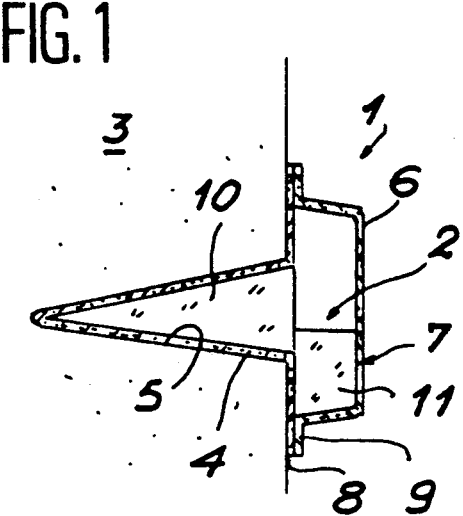
FIGS. 1 to 5 Shows diagrammatically and in section variants of a first embodiment of the check sample of the invention.

FIG. 1 shows diagrammatically and in cross-section a first embodiment of a check sample according to the invention. It comprises an envelope or case 1, sealed in an inviolable manner, which is partly or totally transparent and has a predetermined internal shape. This case contains a meltable object 2 having a predetermined shape. This shape is at least partly different from the internal shape of the case. The object has a total volume smaller than the internal volume of the case and a melting point equal to or below the defreezing or keeping temperature of the product 3 to be checked.

In known manner, the initial shape of the object 2 cannot be reconstituted following an even partially thawed state of reheating of the product, said thawed state or reheating having brought about a melting of the object. It is not possible to reconstitute the predetermined shape of the object even if the melting thereof is partial and no matter what the subsequent refreezing or cooling conditions for the product 3.

According to the invention, the case 1 has a first part 4, which is made invisible and integral with the product 3 by insertion in the latter. This first case part 4 can also be rendered integral with a pack by insertion in a recess provided for this purpose within the pack. In FIG. 1 the line 5 represents either the surface of the frozen product 3, or a pack for the said product.

The case 1 also has a second part 6 integral with the first case part 4, so as to form a tight assembly inviolable by opening the case. This second part has at least one transparent window for rendering visible the object 2. This second part can be totally transparent for making the object 2 visible. The window, which is not shown in the drawing, can either be formed on the periphery of the second part 6, or on one face 7 of said second part. The two case parts can be made from a plastics material and can be joined together by sealing the respective edges 8, 9.

The object 2 melts when the temperature reaches a threshold temperature. This temperature generally corresponds to the thawing or keeping temperature of the product 3. However, this threshold temperature can be below the thawing or keeping temperature if it is wished to follow possible product temperature variations below the freezing or keeping temperature. The meltable object 2 comprises a first portion 10 at least partly filling the first invisible part 4 of the case 1 and a second portion 11 located in the second case part 6 and having a shape which is at least partly different from the internal shape of said second case part 6.

Figure 10:
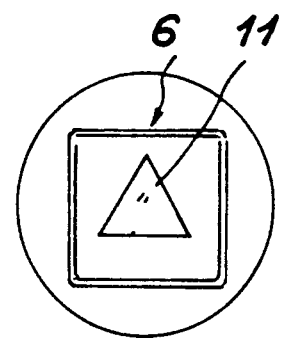
FIGS. 10 to 12 Shows diagrammatically a front view of the first visible part of the check sample according to the invention.
Figure 11:
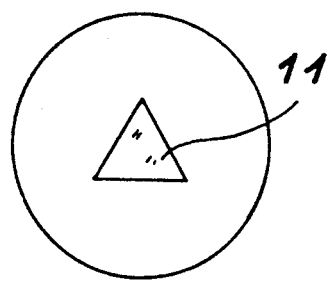
Figure 12:
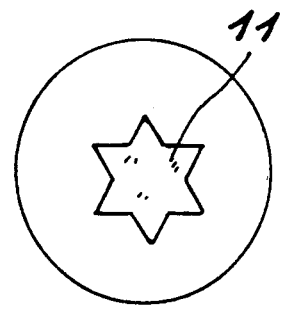

FIGS. 10, 11 and 12 show different non-limitative examples of possible shapes of the second portion 11 of the object seen from the side of the face 7 of the case 1. These shapes can either project or retract. The first and second portion 10 and 11 of the object 2 can be separate or integral with one another.

Figure 2:
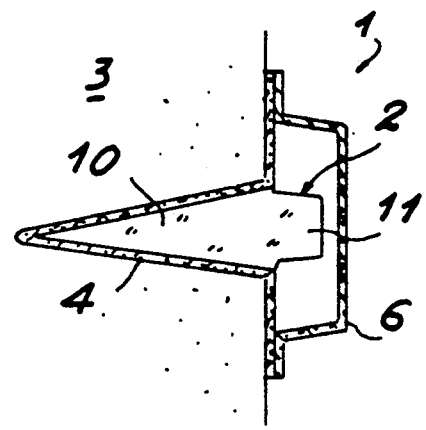

FIG. 2 diagrammatically shows in section a variant of the preceding embodiment. According to this variant, the first and second portions 10, 11 of the object are integral and the second portion 11 is located in the extension of the first portion 10.

When the temperature around the object reaches the threshold temperature, the second portion 11 of the object 2 starts to melt and loses its initial shape. Different shapes of said second portion 11 are shown in FIGS. 10, 11 and 12. The initial shape of the second portion 11 is impossible to reconstitute, even by refreezing or cooling the product, following a partial defreezing or heating. Thus, the consumer is made aware of this thawing or reheating and the vendor can withdraw the products from sale.

As will be shown hereinafter, if the thawing or reheating not only reaches the surface of the product, but also the deeper layers thereof below its surface there is also a total or partial melting of the first portion 10 of the object 2. The two portions of the object are made from the same meltable material in order to avoid eutectic risks on melting.

In the two variants of the first embodiment shown in FIGS. 1 and 2, the second part 4 of the case 1 has a conical shape.

Figure 3:
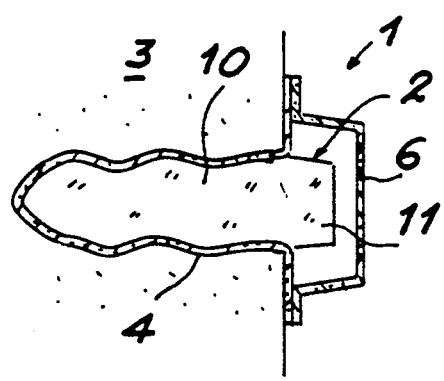

FIG. 3 diagrammatically shows in section another variant of the first embodiment. In this variant, the second part 4 of the case 1 has a helical shape. Therefore this second part can be directly screwed into a tap made in the product 3 or into an appropriately shaped recess formed in the pack for the product 3. In order to make screwing easier, the first part 6 of the case 1 can, as shown in FIG. 10, have a square shape facilitating gripping of the control sample, together with its screwing. In this variant, the first and second portions 10, 11 of the object 2 are integral, but could also be separate.

Figure 4:
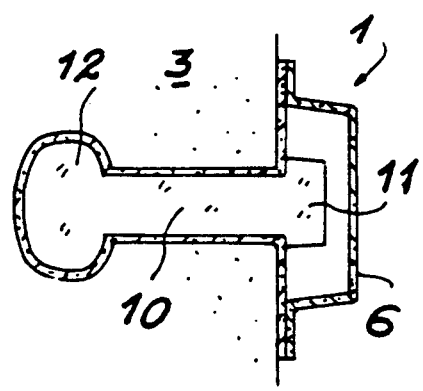

FIG. 4 diagrammatically shows in section another variant of the first embodiment of the control sample according to the invention. In this variant, which more particularly applies to the checking of heterogeneous products, such as e.g. peas, the first portion 10 of the case 1 has on its base a swollen shape 12 favoring maintaining of the case 1 in the product 3 or in an appropriately shaped recess made in a pack containing the said product.

Figure 5:
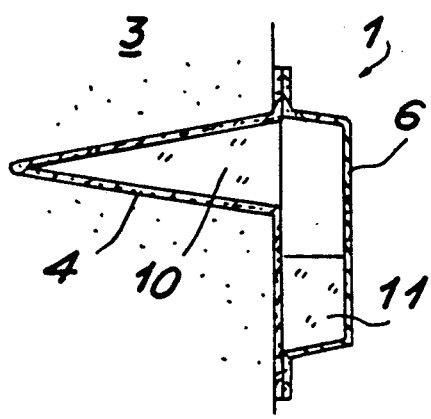

FIG. 5 diagrammatically shows in section another variant of the first embodiment of the case according to the invention. According to this variant, the second part 6 of the case 1 has an asymmetrical shape. The control sample is pressed horizontally into the product 3 or into a recess of a pack for the said product. The second portion 11 of the meltable object is preferably located towards the bottom of the second part 6 of the case, while the first portion 10 of the meltable object partly or totally occupies the first part 4 of the case 1. This first part is obviously pressed either directly into the product 3, or into an appropriate recess of a pack for the said product. The second portion 11 of the object obviously has one of the shapes shown in exemplified form in FIGS. 10, 11 and 12.

Figure 6:
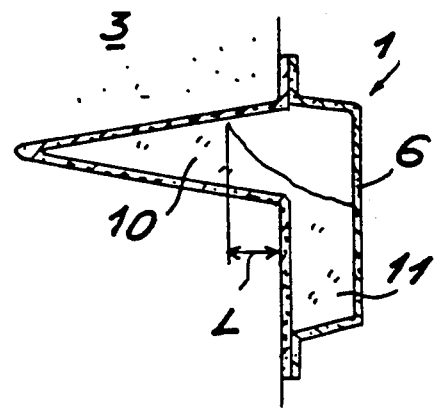
FIGS. 6 Shows diagrammatically and in section one of the variants of the first embodiment in the case where the frozen product has undergone thawing.

FIG. 6 diagrammatically shows in section the preceding variant in the case where the threshold temperature has been exceeded. In this case, the second portion 11 of the meltable object has melted in the bottom of the second part 6 of the case 1, while the first portion 10 of the object has also partly or totally melted and has flowed towards the bottom of the second case part 6. The volume of the meltable object which has melted and which partly fills the bottom of the second part 6 of the case 1 gives information on the depth of thawing or reheating of the product 3 below its surface. The thawing or heating depth reached can also be evaluated by removing the case 1 from the product 3 or the recess in the pack containing the product, so as to measure the distance L giving the thawing or heating depth reached. In the different variants of the first embodiment described hereinbefore in connection with FIGS. 1 to 6, the surface of the second part 6 of the case 1 projects beyond the pack or product. Thus, the melting of the second portion 11 of the object can be brought about when its thawing or keeping threshold temperature is reached on the surface of the product 3 and without said thawing reaching layers located below the product surface. The product can then be declared unsuitable for consumption, whereas the thawing or heating has only been of a very superficial nature.

To avoid this, as a result of the second embodiment of the check sample according to the invention, it is possible to ensure that the second part 6 of the case 1 does not project beyond the surface of the product 3 or the pack containing it. Different variants of this second embodiment are shown in FIGS. 7, 8 and 9.

Figure 7:
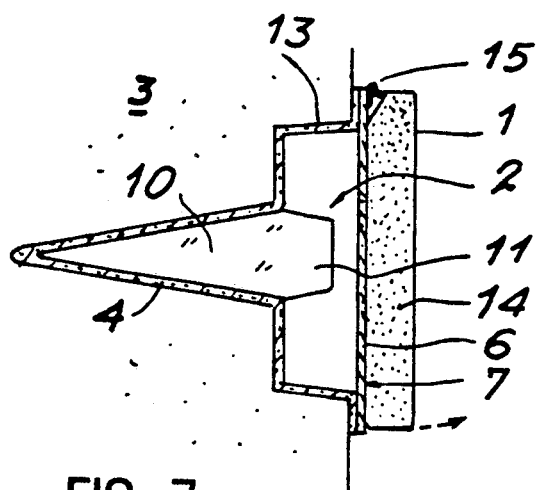
FIGS. 7 to 9 Shows diagrammatically and section variants of a second embodiment of the check sample of the invention.

FIG. 7 shows diagrammatically and in section a case according to a second embodiment of the invention, in which the second portion 11 of the object 2 is at least partly contained in a recess formed in the product 3 or the pack containing it. This recess 13 extends towards the interior of the product pack. The transparent window making it possible to check the partial or total melting of the object 2 is located on the face 7 of the second part 6 of the case. The first part 4 of the case has, as in the embodiment of FIG. 2, a conical shape. The second part 6 of the case is preferably totally contained within the recess 13, so that only the face 7 of the cover sealing said second part of the case is flush with the surface of the product 3 or the pack containing it.

In this and all the other embodiments, the transparent window 7 can be covered with the thermally insulating, flexible layer 14, which is e.g. welded at a point 15 of the window and which makes it possible to avoid a greenhouse effect within the case. This insulating layer can be raised for checking the state of the object within the case. It can e.g. be formed by an expanded polyethylene sheet covered with a thin aluminium film.

Figure 8:
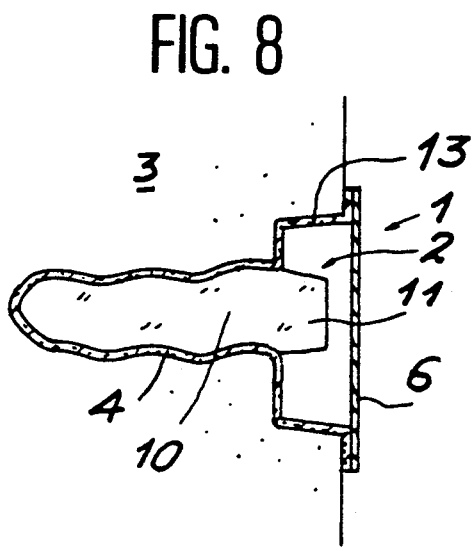
Figure 9:
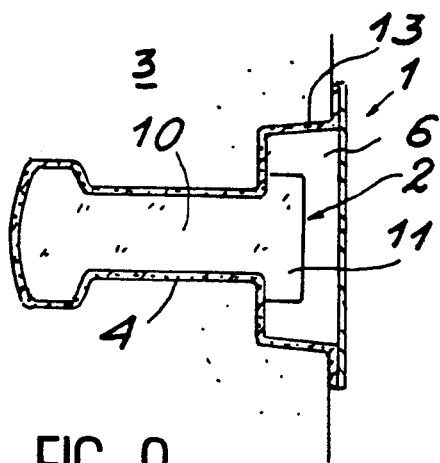

FIG. 8 diagrammatically shows in section a variant of the embodiment of FIG. 7. The second case part 6 is in this case also contained in a recess 13 of the product 3 or a pack containing the latter. The first part 4 of the case 1 has a helical shape, as in the variant of the first embodiment shown in FIG. 3.

FIG. 9 diagrammatically shows in section another variant of this second embodiment. The second part 6 of the case 1 is also contained in a recess 13 of the product 3 or a pack containing the latter. The first part 4 of the case is pressed into a recess of the product or its pack and has a shape comparable to that of the first case part shown in the variant of the first embodiment of FIG. 4.

The second portion 11 of the object 2, for the different variants of the second embodiment, can have one of the shapes shown in FIGS. 10, 11 and 12. This second embodiment of the check sample according to the invention has the main advantage of offering better information on the thawing or possible reheating of the product. Thus, as the second portion 11 of the meltable object 2 does not project over the surface of the product 3 or its pack, the melting of said second portion 11 of the object only takes place when the threshold temperature is exceeded on the surface of the product or within the same and not only outside said surface.

The length of the first part 4 of the case is obviously dependent on the dimensions of the product. This length will vary as a function of whether it is desired to check the thawing or reheating of said product in the vicinity of its surface layers, or in the vicinity of its core.

For the same product, it is possible to use separate check samples respectively containing meltable objects at different threshold temperatures. The use of different check samples of this type makes it possible to obtain much more precise information as to the extent of the unfrozen state or even on the temperature variations of the product, even if the thawing temperature or the keeping limit temperature is not reached. This check sample type also has the advantage of ensuring a perfect thermal contact between the product to be checked and the meltable object permitting said check. The various shapes of the first case part 4 make it possible to adapt the check sample to any product type. The meltable object volume contained in the second case part 6, when there has been a partial or total melting of said object, not only makes it possible to determine whether the threshold temperature has been reached, but also approximately indicates the duration thereof. This volume also makes it possible to determine the thermal energy stored by the product to be checked above said threshold point. Part of the meltable object is made from the same meltable material, so that there is no risk of eutectic effects falsifying the check. Eutectic risks appear in the prior art check samples when the case contains several meltable objects made from different materials. Thus, in this case, the melting of one of the materials can disturb the melting of another and thus provide false information on the threshold temperatures.

The check samples can be put into place after deep-freezing. The product is packed and the pack contains a recess for the check sample. If the product is not packed, the recess for the check sample can e.g. be made by perforating or drilling the deep-frozen product. It is also possible to provide a template having the shape of the check sample put into place in the product before the freezing thereof. This template is then replaced by the check sample following the freezing of the product. Obviously, for the different embodiments described and also for their variants, the check sample is positioned in such a way that melting of the object gives better information on the possible thawing or reheating. Therefore the axis of the check sample is preferably adjacent to a horizontal position.

Obviously, numerous modifications and variations of the present invention are possible in light of the above teachings. It is therefore to be understood that within the scope of the appended claims, the invention may be practiced otherwise than as specifically described herein.

What is claimed is new and desired to be secured by Letters Patent of the United States is:

1. Check sample for a deep-frozen product or a product, whose keeping temperature has to be checked, comprising:

a case sealed in an inviolable manner, which is at least partly transparent, which has a predetermined internal shape and which has a meltable object located in said case having a predetermined shape, said object being at least partly different from the internal shape of the case and having a volume smaller than the internal volume of the case, said object having one of a melting point equal to or below the thawing temperature of said product and a melting temperature equal to or below the keeping temperature of said product, the predetermined shape of said object being impossible to be reconstituted following even a partial heating or thawing of the product resulting in partial melting of said object and despite subsequent product refreezing or cooling conditions, wherein said case comprises a first part which is located within the product and is thus invisible and integral with the product and a second visible part integral with the first part, said object comprising a first portion filling the first invisible part of the case and a second portion having a shape which is at least partly different from the internal shape of the second visible part of the case, said second part of the case having at least one transparent window for rendering said object visible wherein said object is filled in said first part and extends into said second part.

2. Check sample according to claim 1, wherein the surface of the second part of the case projects beyond one of said pack and said product.

3. Check sample according to claim 1, wherein the second part of the case is at least partly contained in a recess formed in one of said pack and said product, extending towards the inside of said one of said pack and said product, said transparent window being visible from the outside of the pack or product.

4. Check sample according to one of claims 1 or 2, wherein said first and second portions of the object are separate and are made from the same meltable material.

5. Check sample according to one of claims 1 or 2, wherein said first and second portions of the object are integral and are made from the same meltable material.

6. Check sample according to one of claims 2 or 3, wherein the window is covered by a flexible, thermally insulating layer partly fixed to the windows and which is removable.

* * * * *